Patented Nov. 24, 1953

2,660,609

UNITED STATES PATENT OFFICE 2,660,609

ISOMERIZATION OF ALKYLENE OXIDES

Max O. Robeson and Richard A. Springer, Corpus Christi, Tex., assignors to Celanese Corporation of America, New York, N. Y., a corporation of Delaware No Drawing. Application April 5, 1950, Serial No. 154,208

4 Claims. (Cl. 260—601)

This invention relates to the isomerization of alkylene oxides and relates more particularly to an improved process for the production of aliphatic aldehydes by the catalytic vapor phase isomerization of alkylene oxides.

An object of this invention is the provision of an improved process for the production of aliphatic aldehydes by the catalytic vapor phase isomerization of alkylene oxides.

Another object of this invention is to provide a process for the catalytic isomerization of alkylene oxides employing a catalyst adapted to be employed in fluidized form and capable of ready regeneration and reuse upon decreased activation.

Other objects of this invention will appear from the following detailed description.

Numerous processes for the catalytic vapor phase isomerization of alkylene oxides such as ethylene oxide, 1,2-propylene oxide or 1,2-butylene oxide, for example, have been proposed. The isomerization of ethylene oxide yields acetaldehyde while in the case of 1,2-propylene oxide, isomerization yields propionaldehyde, allyl alcohol and acetone. In carrying out the prior processes, the use of catalysts, such as alumina, lithium phosphate, alum, aluminum borate, or the oxygen acids of elements of the fifth or sixth groups of the periodic table, or the salts or anhydrides thereof, has been suggested. These catalysts have all been employed in the form of a fixed bed, and in this form they exhibit a satisfactory degree of activity. While substantial advantages may be gained by the use of catalysts in a fluidized form, the catalysts heretofore employed for the isomerization of said alkylene oxides do not lend themselves readily to such application. This is borne out in practice since both the conversion and efficiency of conversion of said alkylene oxides to aldehydes by such isomerization processes wherein the above catalysts are employed in fluidized form is not sufficiently high to be entirely satisfactory.

We have now found that alkylene oxides such as ethylene oxide, 1,2-propylene oxide, or 1,2-butylene oxide may be catalytically isomerized to aldehydes in the vapor phase with a high degree of conversion and efficiency if said isomerization is carried out with the aid of a catalyst, such as silica gel or fuller's earth, employed in a fluidized form. Employing silica gel in fluidized form as the catalyst we have found that 1,2-propylene oxide, for example, may be isomerized to propionaldehyde with conversions to useful products of 36 to 43% per pass and with an efficiency of conversion to propionaldehyde of 70% to 75%. When the other products which are formed such as allyl alcohol and acetone are included in the recovery, the conversion is about 50% with an overall efficiency of 80 to 85% to useful products. Employing fuller's earth in fluidized form as the catalyst, the catalytic isomerization of 1,2-propylene oxides may be effected with a conversion to propionaldehyde of 60 to 65% per pass and with an efficiency of conversion to propionaldehyde of 65 to 70%. The efficiency of conversion is defined as mols of useful products obtained divided by the mols of reactants consumed. When the acetone and allyl alcohol formed are included in the yield, the conversion rises to 70 to 73% with efficiencies of 73 to 76%.

In carrying out the vapor phase catalytic isomerization of alkylene oxides in accordance with our novel process employing fuller's earth or silica gel in fluidized form as the catalyst, the catalyst, preferably of a particle size to pass 30 to 100 mesh, is charged to a reactor, air is then forced through the reactor in a volume sufficient to fluidize the catalyst particles, and the latter are heated at a temperature of about 900° F. for about one hour in the air stream to activate the same. The temperature is allowed to drop to about 300 to 350° F. while maintaining the catalyst in fluidized form with a stream of nitrogen replacing the air. The alkylene oxide to be isomerized is then vaporized and, with the nitrogen flow halted, the alkylene oxide vapors are passed through the reactor at a velocity sufficient to maintain the catalyst particles in fluidized form. The vapor flow is adjusted so that the alkylene oxide vapors are in contact with the catalyst for about 1 to 2 seconds. The resulting isomerization reaction is exothermic. The temperature is allowed to rise from an initial temperature of from 300 to 350° F. to a temperature from about 550 to 650° F. and this higher temperature is maintained by controlling the feed rate and/or external heating or cooling. When fuller's earth is employed as the catalyst, the addition of a small amount of water to the alkylene oxide, e. g. in an amount of up to about 1% by weight thereof, enables the reaction temperature to be controlled more readily. The isomerization product formed is condensed and then fractionated to separate the several components contained therein.

The rate at which the vaporized alkylene oxide feed is passed through the reactor is preferably maintained at from 3 to 4 parts by weight per hour for each part by weight of catalyst employed when silica gel is employed as the catalyst, and about 6 to 8 parts by weight per hour for each part by weight of catalyst when fuller's earth is the catalyst used.

Reactivation of the catalyst is achieved quite readily by heating the catalyst particles in a stream of air while maintaining the temperature at about 900° F. Reactivation is desirable after about 20 to 25 parts by weight of alkylene oxide per part by weight of fuller's earth catalyst and after 5 to 10 parts by weight of alkylene oxide per part by weight of silica gel have been passed therethrough in order to maintain a desirably high degree of conversion and efficiency.

In order further to illustrate our invention, but without being limited thereto, the following examples are given:

*Example I*

180 parts by weight of silica gel of a particle size between 30 and 100 mesh is placed in a reactor, fluidized with the aid of a stream of air and then heated, while fluidized, to a temperature of about 900° F. for a period of about one hour so as to activate the catalyst particles. The air stream is replaced by nitrogen and the temperature gradually reduced to about 350° F. 1,2-propylene oxide is vaporized at a rate of about 588 parts by weight per hour and the oxide vapors are passed through the reactor containing the fluidized catalyst. The rate of vapor feed is about 3.27 parts by weight per hour for each part by weight of catalyst and is sufficient to maintain the catalyst particles in a fluidized condition. The temperature rises due to the exothermic nature of the isomerization reaction and reaches a temperature of about 600° F. With the temperature and rate of feed of the 1,2-propylene oxide stabilized so that the time of contact of the 1,2-propylene oxide vapors with the fluidized catalyst is about 1.39 seconds, the catalytic isomerization is continued for about 3 hours. The reaction products are condensed and collected. The activity of the catalyst exhibits a definite decrease after this period and may then be reactivated by heating in air at 900° F. for about one hour. The mixture of reaction products obtained is fractionated to separate the by-products from the propionaldehyde formed as well as to separate both the isomeric allyl alcohol and acetone which also forms. By this catalytic process employing a fluidized silica gel, the 1,2-propylene oxide is isomerized into propionaldehyde with a conversion of 43% per pass and an efficiency of conversion of 69.9%. Employing a reactivated catalyst under the same reaction conditions and feed rate, the conversion of 1,2-propylene oxide to propionaldehyde is 36.5% per pass with an efficiency of 73%.

*Example II*

113 parts by weight of fuller's earth of 30 to 80 mesh particle size are charged to a reactor and are fluidized and activated by heating in an air stream at 900° F. for one hour. The temperature is then allowed to fall to 300° F. while a current of nitrogen replaces the air. 1,2-propylene oxide is vaporized at a rate of 723.4 parts by weight per hour and the vapors, in admixture with 1% by weight thereof of water which is added to the 1,2-propylene oxide before vaporization, are passed through the reactor. The flow of nitrogen is halted when the 1,2-propylene oxide vapor flow is initiated and the vapor flow serves to maintain the catalyst particles in a fluidized state. The reactor temperature rises to 600° F. due to the exothermic nature of the isomerization reaction but the presence of the water vapor in admixture with the 1,2-propylene oxide vapors keeps the temperature from rising above this temperature. The reaction temperature is maintained at about 600° F. and the isomerization reaction is continued for 3 hours. The contact time of the 1,2-propylene oxide vapors and the fluidized catalyst is about 1.39 seconds. The reaction products formed are condensed, collected and are then fractionally distilled. Based on the recovery obtained, the 1,2-propylene oxide is isomerized into propionaldehyde by the above process with a conversion of 65.8% per pass and an efficiency or 69.4%.

It is to be understood that the foregoing detailed description is given merely by way of illustration and that many variations may be made therein without departing from the spirit of our invention.

Having described our invention, what we desire to secure by Letters Patent is:

1. Process for the isomerization of alkylene oxides to aldehydes which comprises vaporizing an alkylene oxide and passing the resulting vapors through a catalyst comprising fuller's earth while maintaining the catalyst in a fluidized state at an elevated temperature in the presence of a small amount of water as an agent for controlling the reaction temperature.

2. Process for the isomerization of 1,2-propylene oxide to propionaldehyde, which comprises vaporizing 1,2-propylene oxide containing water, the amount of water being up to about 1% by weight of the 1,2-propylene oxide, and passing the vapors through a catalyst comprising fuller's earth while maintaining the catalyst in a fluidized state.

3. Process for the isomerization of 1,2-propylene oxide to propionaldehyde, which comprises vaporizing 1,2-propylene oxide containing water, the amount of water being up to about 1% by weight of the 1,2-propylene oxide, and passing the vapors through a catalyst comprising fuller's earth while maintaining the catalyst in a fluidized state and at a temperature of 550° to 650° F.

4. Process for the isomerization of 1,2-propylene oxide to propionaldehyde, which comprises vaporizing 1,2-propylene oxide containing water, the amount of water being up to about 1% by weight of the 1,2-propylene oxide, and passing the vapors through a catalyst comprising fuller's earth in an amount of from 6 to 8 parts by weight per hour for each part by weight of catalyst while maintaining the catalyst in a fluidized state and at a temperature of 550° to 650° F.

MAX O. ROBESON.
RICHARD A. SPRINGER.

References Cited in the file of this patent

Ellis, "The Chemistry of Petroleum Derivatives" (1934), pages 546–7, The Chemical Catalog Co., Inc., New York.

Berkman et al., "Catalysis" (1940), pages 990–993, Reinhold Pub. Corp., N. Y.

Egloff et al., "Isomerization of Pure Hydrocarbons," pages 58–59 (1942), Amer. Chem. Soc., Monograph series 88, Reinhold Pub. Corp., New York.

Thomas et al., "Cracking With Catalysts," National Petroleum News, pages 570–576, December 1, 1943.

Hackh, Chemical Dictionary, pages 346, 359, 549, 769–770 (1944), The Blakiston Company, Philadelphia.